(12) United States Patent
Peng et al.

(10) Patent No.: US 12,172,915 B2
(45) Date of Patent: Dec. 24, 2024

(54) SYSTEM AND METHOD FOR REALIZING PARTIAL ANAMMOX ADVANCED NITROGEN AND PHOSPHORUS REMOVAL THROUGH MAINSTREAM AND SIDESTREAM BIOFILM CYCLIC ALTERNATING FOR MUNICIPAL WASTEWATER TREATMENT PLANT

(71) Applicant: Beijing University of Technology, Beijing (CN)

(72) Inventors: Yongzhen Peng, Beijing (CN); Jianwei Li, Beijing (CN); Jinjin Liu, Beijing (CN); Liang Zhang, Beijing (CN)

(73) Assignee: Beijing University of Technology, Beijing (CN)

( * ) Notice: Subject to any disclaimer, the term of this patent is extended or adjusted under 35 U.S.C. 154(b) by 467 days.

(21) Appl. No.: 17/763,807

(22) PCT Filed: Jul. 21, 2021

(86) PCT No.: PCT/CN2021/107608
§ 371 (c)(1),
(2) Date: Mar. 25, 2022

(87) PCT Pub. No.: WO2022/088778
PCT Pub. Date: May 5, 2022

(65) Prior Publication Data
US 2023/0331609 A1    Oct. 19, 2023

(30) Foreign Application Priority Data
Oct. 31, 2020  (CN) .......................... 202011197355.6

(51) Int. Cl.
C02F 3/30       (2023.01)
C02F 3/08       (2023.01)
(Continued)

(52) U.S. Cl.
CPC .............. *C02F 3/307* (2013.01); *C02F 3/085* (2013.01); *C02F 3/308* (2013.01);
(Continued)

(58) Field of Classification Search
CPC .......... C02F 3/307; C02F 3/085; C02F 3/308; C02F 2101/105; C02F 2101/16;
(Continued)

(56) References Cited

U.S. PATENT DOCUMENTS

2020/0325051 A1* 10/2020  Gil ............................ C02F 1/52

FOREIGN PATENT DOCUMENTS

CN    104334500 A    2/2015
CN    109133348 A    1/2019
(Continued)

OTHER PUBLICATIONS

Foreign Communication from Related Application—International Search Report and Written Opinion of the International Searching Authority, International Application No. PCT/CN2021/107608, dated Oct. 20, 2021, 11 pages.
(Continued)

*Primary Examiner* — Madeline Gonzalez
(74) *Attorney, Agent, or Firm* — Conley Rose, P.C.; Rodney B. Carroll

(57) ABSTRACT

The present application provides a system and method for realizing partial anammox advanced nitrogen and phosphorus removal through mainstream and sidestream biofilm cyclic alternating for a municipal wastewater treatment plant. The system includes three main component units: a mainstream zone (a), an advanced treatment zone (b) and a side stream zone (c). Advanced nitrogen and phosphorus removal of the entire system is realized through cyclic alternating of biofilms. In the mainstream zone (a), the main function of an anaerobic/anoxic zone is to perform hetero-
(Continued)

trophic denitrification nitrogen removal, and partial denitrification/anammox autotrophic nitrogen removal, and the main function of an oxic zone is to remove organic matter, perform aerobic phosphorus uptake, and complete a nitrification reaction. In a denitrification fluidized bed (8) in the advanced treatment zone (b), advanced treatment is performed for a mixed solution of effluent and raw water in the mainstream zone to achieve heterotrophic denitrification, and partial denitrification/anammox autotrophic nitrogen removal. A high-ammonia nitrogen anammox nitrogen removal zone (7) in the sidestream zone (c) enriches anammox bacteria based on biofilms, realizing autotrophic nitrogen removal of sidestream high-ammonia nitrogen wastewater.

7 Claims, 2 Drawing Sheets

(51) Int. Cl.
  *C02F 101/10* (2006.01)
  *C02F 101/16* (2006.01)
(52) U.S. Cl.
  CPC .... *C02F 2101/105* (2013.01); *C02F 2101/16* (2013.01); *C02F 2101/163* (2013.01); *C02F 2209/22* (2013.01); *C02F 2209/40* (2013.01); *C02F 2209/44* (2013.01); *C02F 2301/043* (2013.01); *C02F 2301/046* (2013.01)
(58) Field of Classification Search
  CPC ............. C02F 2101/163; C02F 2209/22; C02F 2209/40; C02F 2209/44; C02F 2301/043; C02F 2301/046; C02F 3/303; C02F 3/305
  USPC ......................................................... 210/605
  See application file for complete search history.

(56) References Cited

FOREIGN PATENT DOCUMENTS

| | | |
|---|---|---|
| CN | 109502906 A | 3/2019 |
| KR | 102099380 B1 | 4/2020 |

OTHER PUBLICATIONS

Foreign Communication from Related Application—Chinese Office Action with English Translation, CN Patent Application No. 202011197355.6 dated Dec. 8, 2021, 9 pages.

* cited by examiner

SYSTEM AND METHOD FOR REALIZING PARTIAL ANAMMOX ADVANCED NITROGEN AND PHOSPHORUS REMOVAL THROUGH MAINSTREAM AND SIDESTREAM BIOFILM CYCLIC ALTERNATING FOR MUNICIPAL WASTEWATER TREATMENT PLANT

CROSS REFERENCE TO RELATED APPLICATIONS

The present application claims priority to Chinese Patent Application No. 202011197355.6, filed to the China Patent Office on Oct. 31, 2020 and entitled "SYSTEM AND METHOD FOR REALIZING PARTIAL ANAMMOX ADVANCED NITROGEN AND PHOSPHORUS REMOVAL THROUGH MAINSTREAM AND SIDESTREAM BIOFILM CYCLIC ALTERNATING FOR MUNICIPAL WASTEWATER TREATMENT PLANT", the entire contents of which are incorporated herein by reference.

TECHNICAL FIELD

The present application relates to the technical field of activated sludge process and biofilm process wastewater treatment, and is applicable to the technical field of wastewater treatment, such as upgrading and reconstruction of newly-built wastewater plants and already-built wastewater plants, and treatment of municipal wastewater and industrial wastewater.

BACKGROUND

The up-to-standard discharge of municipal wastewater has been the focus of attention in recent years, especially removal of nitrogen. At present, many wastewater treatment plants are still facing the status quo or risk of not meeting total nitrogen discharge standards. The reason is that most of wastewater collected in municipal wastewater treatment plants has a relatively low carbon to nitrogen ratio, which limits the nitrogen removal load of traditional nitrification and denitrification processes. In order to meet increasingly stringent discharge requirements, a method of adding carbon sources is widely used to enhance nitrogen removal, but the cost of adding carbon sources is quite high and it is necessary to add a post-installation security unit to remove residual organic matter. On the other hand, the completion of nitrification requires a large amount of aeration, which accounts for a high proportion of operating energy consumption of an entire wastewater treatment plant. Therefore, seeking low-consumption, high-efficiency and stable new nitrogen removal technologies and processes has become an urgent goal in the water treatment industry.

An anammox technology is considered to be the most promising alternative in biological nitrogen removal of municipal wastewater. It does not rely on organic carbon sources and has the technical advantage of overcoming the low carbon to nitrogen ratio. Regarding the treatment of high-ammonia nitrogen wastewater, both integrated and two-stage partial nitrification/anammox processes have shown good nitrogen removal effects. In other words, the anammox-based process provides a more reliable treatment method for high-nitrogen wastewater under moderate temperature conditions. So far, more than 100 anammox high-ammonia nitrogen wastewater treatment projects have been built all over the world.

A mainstream anammox technology treats low-ammonia nitrogen wastewater (municipal wastewater) with greater nitrogen content, and it will have revolutionary engineering significance if stable application is achieved. Generally speaking, a mainstream anammox process of municipal wastewater requires the separation and removal of organic matter and nitrogen. The organic matter is first removed or captured and recycled by a high-efficiency activated sludge method, and then remaining nitrogen-containing wastewater is mainly removed by a partial nitrification/anammox pathway, which in theory will significantly reduce oxygen consumption and substantially increase biogas production. At present, although more and more experimental evidence supports the feasibility of the anammox technology for municipal wastewater, the bottleneck problem of the process of direct treatment of actual municipal wastewater still needs to be broken through, including the difficulty of controlling growth of nitrite oxidizing bacteria, unstable retention of anammox bacteria, a low-temperature inhibition effect, etc.

Breaking through mainstream municipal wastewater partial anammox has practical engineering significances. Compared with the mainstream anammox technology that achieves complete autotrophic nitrogen removal of municipal wastewater, if the proportion of total nitrogen removal by anammox is low, it should be referred to as mainstream partial anammox. In recent years, with the deeper research on that the partial denitrification provides nitrite nitrogen for anammox bacteria to enhance nitrogen removal, new progress is brought to solving these problems. The principle of the anammox technology promoted by the mainstream wastewater partial denitrification has been verified in the first-stage project of Xi'an Fourth Wastewater Treatment Plant, China, which has substantially promoted the application of partial anammox in municipal wastewater treatment. In a single reactor, the anammox reaction and denitrification reaction are carried out at the same time, and an electron donor of the anammox reaction comes from the nitrite nitrogen produced in the denitrification process, which bypasses the bottleneck problem that nitrite oxidizing bacteria is difficult to control in the process of municipal wastewater treatment by partial nitrification/anammox process, effectively solves the difficult problem of stable acquisition of nitrite nitrogen in the anammox process, and significantly reduces the total nitrogen concentration in effluent compared with a traditional nitrification and denitrification process. The development of this technology has attracted wide attention in the field of international water treatment, and has practical research significance and engineering application prospects.

SUMMARY

1. A system and method for realizing partial anammox advanced nitrogen and phosphorus removal through mainstream and sidestream biofilm cyclic alternating for a municipal wastewater treatment plant have three main constituent units: a mainstream zone (a), an advanced treatment zone (b) and a sidestream zone (c). In the mainstream zone (a): raw water (1) enters the mainstream zone (a), and passes through an anaerobic zone (2), an anoxic zone (3), an oxic zone (4) and a sedimentation tank (5) in sequence; a bottom of the sedimentation tank (5) is connected with the anaerobic zone (2) through a sludge return pipeline (9); a tail end of the oxic zone (4) is connected with the anoxic zone (3) through a nitrification liquid return pipeline (10); and a blast system (16) is connected with the oxic zone (4). In the advanced treatment zone (b): effluent of the sedimentation tank (5)

enters a denitrification fluidized bed (8), at the same time, the raw water (1) also enters the denitrification fluidized bed (8), and system effluent (12) can be discharged directly or after being retreated by a physicochemical method, and can also be recycled. In the sidestream zone (c): residual sludge discharged from the sedimentation tank (5) enters a sludge digestion zone (6), supernatant produced after digestion treatment enters a high-ammonia nitrogen anammox nitrogen removal zone (7), and all wastewater produced after treatment is returned to a water inlet pipeline. The system is provided with three biofilm cyclic alternating facilities: a first cyclic alternating facility (13) connects the anaerobic zone (2) with the high-ammonia nitrogen anammox nitrogen removal zone (7); a second cyclic alternating facility (14) connects the anoxic zone (3) with the high-ammonia nitrogen anammox nitrogen removal zone (7); and a third cyclic alternating facility (15) connects the denitrification fluidized bed (8) with the high-ammonia nitrogen anammox nitrogen removal zone (7).

2. Further, the anaerobic zone (2), the anoxic zone (3), the high-ammonia nitrogen anammox nitrogen removal zone (7) and the denitrification fluidized bed (8) need to be internally provided with a carrier (17) to provide an anoxic microenvironment for nitrogen removal functional microorganisms, which is conducive to symplastic growth of denitrification bacteria and anammox bacteria. The biofilm filling ratios of the anaerobic zone (2) and the anoxic zone (3) are less than 66.7%, the biofilm filling ratio of the high-ammonia nitrogen anammox nitrogen removal zone (7) is 40%-80%, and the carrier filling ratio of the denitrification fluidized bed (8) is 10-60%.

3. Further, the three biofilm cyclic alternating facilities (13), (14) and (15) are disposed. The first cyclic alternating facility (13) is configured to exchange biofilms between the anaerobic zone (2) and the high-ammonia nitrogen anammox nitrogen removal zone (7). The second cyclic alternating facility (14) is configured to exchange biofilms between the anoxic zone (3) and the high-ammonia nitrogen anammox nitrogen removal zone (7). The third cyclic alternating facility (15) is configured to exchange biofilms between the denitrification fluidized bed (8) and the high-ammonia nitrogen anammox nitrogen removal zone (7). An exchange interval is greater than 3 months according to the autotrophic nitrogen removal activity of the biofilms in the running process.

4. Further, a process of the mainstream zone (a) is not limited to a pusher $A^2/O$ process formed by combining the anaerobic zone (2), the anoxic zone (3) and the oxic zone (4) with the sludge return pipeline (9) and the nitrification liquid return pipeline (10), and can also be similar or improved processes, for example, A/O, multi-stage A/O and UCT. The sludge return ratio is controlled to be 50%400%, and the nitrification liquid return ratio is controlled to be 75%-200%. Total hydraulic retention time in the mainstream zone (a) is designed to be 10-16 hours, and hydraulic retention time of the oxic zone is 5-9 hours. Dissolved oxygen of the tail end of the oxic zone is controlled to be 1-3 mg/L to ensure completion of a nitration reaction.

5. Further, the mainstream zone (a) and the advanced treatment zone (b) can be directly connected through a pipeline, and one or more of a coagulative sedimentation tank, a filter tank, and a disinfection tank can also be disposed between the mainstream zone (a) and the advanced treatment zone (b).

6. Further, the high-ammonia nitrogen anammox nitrogen removal zone (7) in the sidestream zone (c) can adopt an integrated anammox process, or a two-stage anammox process to enrich anammox bacteria on biofilms. The concentration of influent ammonia nitrogen in the sidestream zone is 300-1500 mg/L, the concentration of the dissolved oxygen is 0.2-1.0 mg/L, and a TN removal load is controlled to be 0.3-3 $kgN/(m^3 \cdot d)$.

7. Further, the raw water can be wastewater passing through structures of an inlet well, an adjustment tank, a coarse bar screen, a fine bar screen, a grit tank, and a primary sedimentation tank in sequence, or wastewater passing through one or more of the above structures.

8. Further, in the mainstream zone (a), the biofilm and the flocculent sludge coexist, and the concentration of the flocculent sludge is 1500-6000 mgSS/L; the denitrification fluidized bed (8) in the advanced treatment zone (b) does not contain flocculent sludge; and in the sidestream zone (c), the biofilm and the flocculent sludge coexist, and the concentration of the flocculent sludge is 6000-10000 mgSS/L.

9. Further, the system and method for realizing partial anammox through mainstream and sidestream biofilm cyclic alternating for the municipal wastewater treatment plant are characterized in that:

(1) The raw water (1) enters the mainstream zone (a), the raw water containing ammonia nitrogen first enters the anaerobic zone (2), the concentration of influent ammonia nitrogen is 30-60 mg/L, and the carbon-nitrogen ratio is 2-6. Simultaneously, return sludge from the bottom of the sedimentation tank (5) enters the front end of the anaerobic zone (2) through the sludge return pipeline (9). In addition, all the wastewater treated by high-ammonia nitrogen anammox nitrogen removal zone (7) is also returned to the front end of the anaerobic zone (2), and the wastewater contains nitrate nitrogen with the concentration of 30-75 mg/L. An anaerobic phosphorus release reaction is performed in the anaerobic zone (2): phosphorus-accumulating bacteria use volatile fatty acids VFAs in the raw water to synthesize an internal carbon source PHAs to reduce the C/N ratio and release phosphorus. Nitrate nitrogen can also be subjected to heterotrophic denitrification nitrogen removal using the carbon source in the raw water, namely, the process of reducing nitrate nitrogen to nitrogen. At the same time, partial denitrification can be promoted to generate nitrite nitrogen in a low C/N ratio environment. The anammox bacteria on the carrier (17) in the anaerobic zone use ammonia nitrogen and nitrite nitrogen for anammox autotrophic nitrogen removal.

(2) Mixed liquid treated in the anaerobic zone (2) enters the anoxic zone (3), and simultaneously, nitrification liquid from the tail end of the oxic zone (4) through the nitrification liquid return pipeline (10) enters the anoxic zone (3). The return ratio of the nitrification liquid is controlled to be 75%-200%. The nitrification liquid contains nitrate nitrogen, and the concentration of the nitrate nitrogen is 5-14 mg/L. In the anoxic zone (3), the nitrate nitrogen uses a carbon source in wastewater for heterotrophic denitrification nitrogen removal, namely, the process of reducing nitrate nitrogen to nitrogen. At the same time, in the low C/N ratio environment, partial denitrification can be promoted to produce nitrite nitrogen. Anammox bacteria on the carrier (17) in the anoxic zone use ammonia nitrogen and the nitrate nitrogen for anammox autotrophic nitrogen removal. The autotrophic nitrogen loss of the entire system is 10%-50%, and the nitrogen removal load of the system is 0.06-0.2 $kgN/m^3/d$.

(3) Mixed liquid treated in the anoxic zone (3) enters the oxic zone (4) for an aerobic reaction. On one hand, with oxygen as an electron acceptor and PHAs as an electron donor, the phosphorus-accumulating bacteria are subjected to aerobic phosphorus uptake to be removed. The phosphorus concentration of effluent is 0.5 mg/L or below. When the carbon-nitrogen ratio is too low, the phosphorus concentration should be controlled to be 0.8 mg/L or below, and subsequently chemical phosphorus removal is performed. Residual organic matter will also be removed by aeration, and the COD concentration of the effluent is less than 50 mg/L. On the other hand, a sufficient nitrification reaction is performed, and nitrification bacteria convert ammonia nitrogen into nitrate nitrogen under aerobic conditions, and the ammonia nitrogen concentration in the effluent is less than 1.0 mg/L.

(4) Mixed liquid treated in the oxic zone (4) flows into the sedimentation tank (5) to realize sludge-water separation. The bottom sludge is returned to the anaerobic zone (2) through the sludge return pipeline (9), and the sludge return ratio is controlled to be 50%-100%. The effluent of the sedimentation tank (5) enters the advanced treatment zone (b) for further treatment.

(5) In the advanced treatment zone (b), the effluent of the sedimentation tank (5) enters the denitrification fluidized bed (8). The effluent contains nitrate nitrogen with the concentration being 5-15 mg/L. At the same time, the raw water (1) also enters the denitrification fluidized bed (8) through the bypass pipeline (11). The raw water contains organic matter and ammonia nitrogen, and the ammonia nitrogen concentration is controlled to be 3-10 mg/L. In the denitrification fluidized bed (8), nitrate nitrogen uses the carbon source in the wastewater for heterotrophic denitrification nitrogen removal, namely, the process of reducing nitrate nitrogen to nitrogen. Partial denitrification is performed in the low C/N ratio environment to produce nitrite nitrogen. Anammox bacteria on the carrier (17) in the denitrification fluidized bed (8) utilize the ammonia nitrogen and the nitrite nitrogen for anammox nitrogen removal. The system effluent (12) can be discharged directly or after being retreated by the physicochemical method, and can also be recycled.

(6) In the sidestream zone (c), the residual sludge discharged from the sedimentation tank (5) enters the sludge digestion zone (6) after sedimentation and concentration. The supernatant produced after the digestion treatment enters the high-ammonia nitrogen anammox nitrogen removal zone (7). The supernatant contains ammonia nitrogen with the high concentration, and the ammonia nitrogen concentration is 300-1500 mg/L. In the sidestream zone (c), based on the partial nitrification/anammox technology, both the integrated anammox process and the two-stage anammox process can be adopted to enrich the biofilms. Ammonia oxidizing bacteria convert all or part of ammonia nitrogen into nitrite, and then the ammonia nitrogen and the nitrite are converted into nitrogen by the anammox bacteria. All the wastewater treated by the high-ammonia nitrogen anammox nitrogen removal zone (7) is returned to the water inlet pipeline.

The system for realizing partial anammox advanced nitrogen and phosphorus removal through mainstream and sidestream biofilm cyclic alternating for the municipal wastewater treatment plant is characterized in that in the mainstream zone (a), the main function of the anaerobic zone is anaerobic phosphorus release, the main function of the anoxic zone is to perform heterotrophic denitrification nitrogen removal, and partial denitrification/anammox autotrophic nitrogen removal, and the main function of the oxic zone is to remove COD in the mixed liquid, and perform aerobic phosphorus uptake, and the sufficient nitrification reaction. The high-ammonia nitrogen anammox nitrogen removal zone (7) in the sidestream zone (c) adopts the integrated or two-stage partial nitrification/anammox process to enrich the anammox bacteria in the biofilms, realizing the autotrophic denitrification of sidestream high-ammonia nitrogen wastewater. In the denitrification fluidized bed (8) in the advanced treatment zone (b), advanced treatment is performed for mixed liquid of effluent and raw water in the mainstream zone to realize heterotrophic denitrification, and partial denitrification/anammox autotrophic nitrogen removal. The carrier easily forming biofilms is disposed in the anaerobic zone (2), the anoxic zone (3), the high-ammonia nitrogen anammox nitrogen removal zone (7) and the denitrification fluidized bed (8) to strengthen growth and retention of the denitrification bacteria and the anaerobic bacteria. The system is provided with the three biofilm cyclic alternating facilities (13), (14) and (15) to connect each main constituent unit. The partial anammox advanced nitrogen and phosphorus removal of the whole system is realized by controlling cyclic alternating of the biofilms.

Compared with a traditional activated sludge process-based nitrification and denitrification process for a municipal wastewater treatment plant, the system for realizing partial anammox advanced nitrogen and phosphorus removal through mainstream and sidestream biofilm cyclic alternating for the municipal wastewater treatment plant has the following advantages:

(1) Significantly reduced aeration quantity. The traditional activated sludge process-based nitrification and denitrification process for the municipal wastewater treatment plant theoretically consumes 4.57 g of $O_2$ for conversion of 1 g of $NH_4^+$—N, while in this system, due to partial anammox autotrophic nitrogen removal, a certain proportion of ammonia nitrogen is converted into nitrate nitrogen without aeration, and theoretically consumption is 2.29-4.57 g of $O_2$, which can significantly reduce the aeration energy consumption of the wastewater treatment plant.

(2) Less carbon sources and even no carbon source. The traditional nitrification and denitrification process theoretically needs to provide 2.86 g of COD to remove 1 g of $NO_3^-$—N; while in this system, due to partial anammox autotrophic nitrogen removal, a certain proportion of nitrate nitrogen can be converted into nitrogen without a carbon source, at the same time, the conversion of the nitrate nitrogen into nitrogen in the reduction process needs no carbon source, and corresponding carbon sources saved can be further used to remove total nitrogen. Therefore, the system can theoretically provide a small quantity of carbon sources to remove 1 g of $NH_4^+$—N. When the raw water has little organic matter, the quantity of added carbon sources is significantly reduced compared with the traditional nitrification and denitrification process. When the organic matter in the raw water reaches a certain range, a more ideal denitrification effect can be realized without adding carbon sources.

(3) Low sludge output. The reaction process of the system is partial autotrophic nitrogen removal, which effectively reduces the sludge output, and is beneficial to reducing the cost of sludge disposal.

(4) High stability of autotrophic nitrogen removal. The system combines a mainstream partial denitrification and partial anammox coupled process with a sidestream partial nitrification and anammox coupled process, and both the mainstream process and the sidestream process have high stability.

(5) High engineering applicability. It is simple to upgrade and reconstruct already-built water plants, and the system is easy to promote and apply. For newly-built wastewater treatment plants, the system reaches the same nitrogen removal load as the traditional nitrification and denitrification process design, and can save floor space.

BRIEF DESCRIPTION OF THE DRAWINGS

In FIG. 1: 1—Raw water; 2—Anaerobic zone; 3—Anoxic zone; 4—Oxic zone; 5—Sedimentation tank; 6—Sludge digestion zone; 7—High-ammonia nitrogen anammox nitrogen removal zone; 8—Denitrification fluidized bed; 9—Sludge return pipeline; 10—Nitrification liquid return pipeline; 11—Bypass pipeline; 12—System effluent; 13—Cyclic alternating facility (exchange between 2 and 7); 14—Cyclic alternating facility (exchange between 3 and 7); 15—Cyclic alternating facility (exchange between 8 and 7); 16—Blast system; and 17—Carrier.

DETAILED DESCRIPTION

Figure 1:
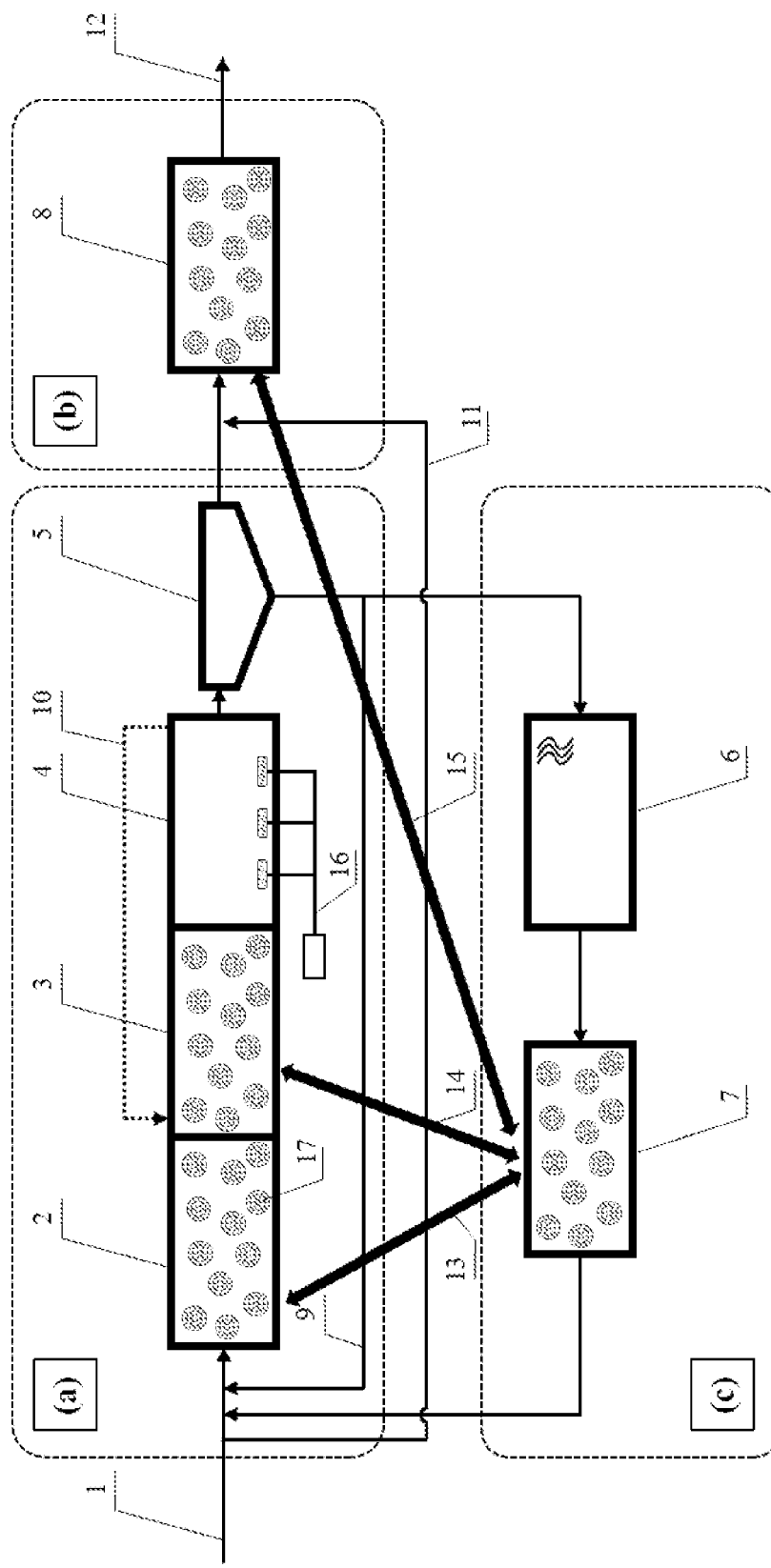
FIG. 1 is a system for realizing partial anammox advanced nitrogen and phosphorus removal through mainstream and sidestream biofilm cyclic alternating for a municipal wastewater treatment plant.
Figure 2:
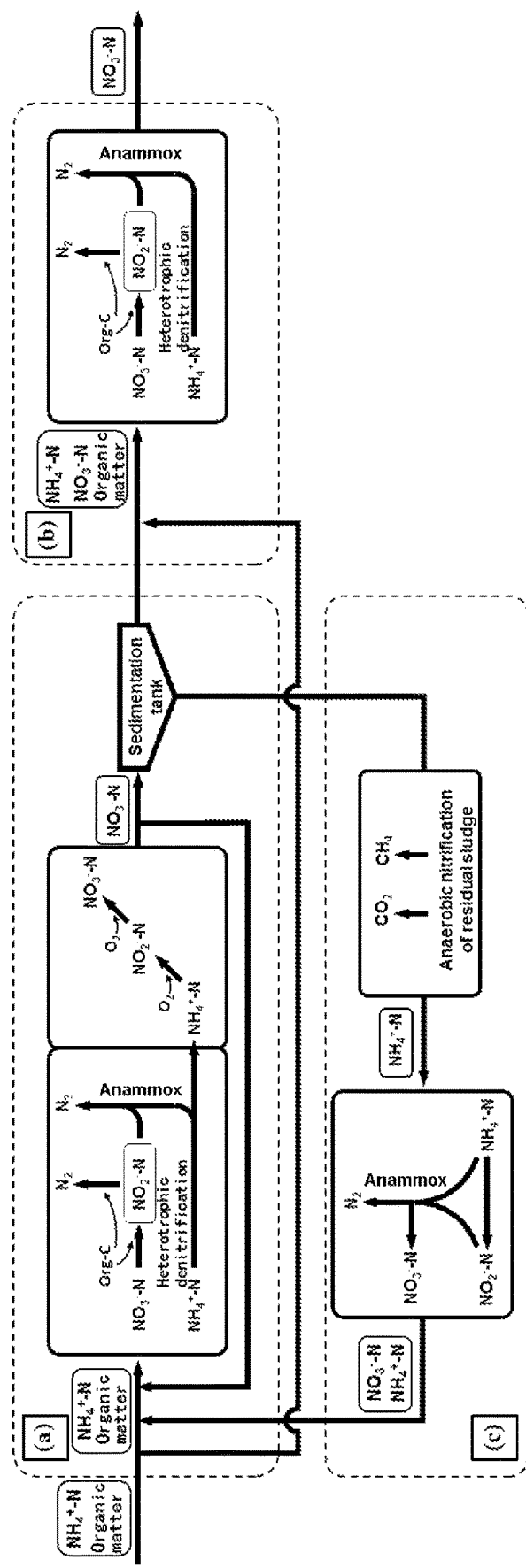
FIG. 2 is a technical principle for realizing partial anammox through mainstream and sidestream biofilm cyclic alternating for a municipal wastewater treatment plant.

With reference to FIG. 1, the implementation solution of the present application is described in detail:

(1) Start a system: activated sludge is inoculated from a traditional wastewater treatment plant, and added to a mainstream zone (a) to make the sludge concentration be 1500-6000 mg/L, and then an anammox biofilm that has been cultured (such as a polyethylene filler biofilm with the diameter being 25 mm) is inoculated to an anaerobic zone (2), an anoxic zone (3), a high-ammonia nitrogen anammox nitrogen removal zone (7) and a denitrification fluidized bed (8) to provide an anoxic microenvironment for nitrogen removal functional microorganisms, which is conducive to growth of denitrification bacteria and anammox bacteria. When inoculation conditions are not available, empty biofilm carriers can be added to the anaerobic zone (2), the anoxic zone (3), the high-ammonia nitrogen anammox nitrogen removal zone (7) and the denitrification fluidized bed (8), and as the system runs, biofilm culturing is gradually realized in the anaerobic zone (2), the anoxic zone (3), the high-ammonia nitrogen anammox nitrogen removal zone (7) and the denitrification fluidized bed (8).

(2) Main operating parameters are set as follows: the sludge return ratio is controlled to be 50%-125%. The dissolved oxygen concentration of an oxic zone is controlled to be 1.0-3.0 mg/L to ensure completion of nitrification. Effluent of a sedimentation tank (5) enters the denitrification fluidized bed (8), while a part of raw water (1) also enters the denitrification fluidized bed (8) through a bypass (11). The flow rate and proportion of the two types of influent are adjusted according to water quality after mixing, for example, $COD/NO_3^-$—N is controlled to be 2.0-5.0, and $NO_3^-$—N/$NH_4^+$—N is controlled to be 1.0-3.0. Hydraulic retention time: the average hydraulic retention time HRT of the mainstream zone (a) is controlled to be 10-16 h, the average hydraulic retention time HRT of the denitrification fluidized bed (8) is controlled to be 1-5 h, and the average hydraulic retention time HRT of the high-ammonia nitrogen anammox nitrogen removal zone (7) is controlled to be 12-48 h. Sludge retention time: the sludge age of flocculent sludge in the mainstream zone (a) is controlled to be 8-16 days, and is appropriately adjusted according to seasonal temperatures. After the system runs stably, when the $NH_4^+$—N concentration of the influent is 40 mg/L and COD/TN of the influent is 4, the COD concentration of effluent is 20-50 mg/L, the $NH_4^+$—N concentration is 0-2 mg/L, the $NO_3^-$—N concentration is 0-8 mg/L, and the TN concentration is 0-10 mg/L.

What is claimed is:

1. A system for realizing partial anammox advanced nitrogen and phosphorus removal through mainstream and sidestream biofilm cyclic alternating for a municipal wastewater treatment plant, comprising three main constituent units: a mainstream zone, an advanced treatment zone and a sidestream zone, wherein in the mainstream zone: raw water enters the mainstream zone, and passes through an anaerobic zone, an anoxic zone, an oxic zone and a sedimentation tank in sequence, a bottom of the sedimentation tank is connected with the anaerobic zone through a sludge return pipeline, a tail end of the oxic zone is connected with the anoxic zone through a nitrification liquid return pipeline, and a blast system is connected with the oxic zone; in the advanced treatment zone: effluent of the sedimentation tank enters a denitrification fluidized bed, and at the same time, the raw water also enters the denitrification fluidized bed; in the sidestream zone: residual sludge discharged from the sedimentation tank enters a sludge digestion zone, supernatant produced after digestion treatment enters a high-ammonia nitrogen anammox nitrogen removal zone, and all wastewater produced after treatment is returned to a water inlet pipeline; and the system is provided with three biofilm cyclic alternating facilities: a first cyclic alternating facility connects the anaerobic zone with the high-ammonia nitrogen anammox nitrogen removal zone, a second cyclic alternating facility connects the anoxic zone with the high-ammonia nitrogen anammox nitrogen removal zone, and a third cyclic alternating facility connects the denitrification fluidized bed with the high-ammonia nitrogen anammox nitrogen removal zone.

2. The system of claim 1, wherein the anaerobic zone, the anoxic zone, the high-ammonia nitrogen anammox nitrogen removal zone and the denitrification fluidized bed need to be internally provided with a carrier to provide an anoxic microenvironment for nitrogen removal functional microorganisms; wherein the biofilm filling ratios of the anaerobic zone and the anoxic zone are less than 66.7%, the biofilm filling ratio of the high-ammonia nitrogen anammox nitrogen removal zone is 40%-80%, and the carrier filling ratio of the denitrification fluidized bed is 10-60%.

3. The system of claim 1, wherein the first cyclic alternating facility is configured to exchange biofilms between the anaerobic zone and the high-ammonia nitrogen anammox nitrogen removal zone; the second cyclic alternating facility is configured to exchange biofilms between the anoxic zone and the high-ammonia nitrogen anammox nitrogen removal zone; the third cyclic alternating facility is configured to exchange biofilms between the denitrification fluidized bed and the high-ammonia nitrogen anammox nitrogen removal zone; and an exchange interval is greater than 3 months.

4. The system of claim 1, wherein a process of the mainstream zone is a pusher $A^2/O$ process formed by combining the anaerobic zone, the anoxic zone and the oxic zone with the sludge return line and the nitrification liquid return line, or A/O, multi-stage A/O and UCT; the sludge return ratio is controlled to be 50%-100%, and a nitrification liquid return ratio is controlled to be 75%-200%; total hydraulic retention time in the mainstream zone is designed to be 10-16 hours, and hydraulic retention time of the oxic zone is 5-9 hours; and dissolved oxygen of the tail end of the oxic zone is controlled to be 1-3 mg/L to ensure completion of a nitration reaction.

5. The system of claim 1, wherein the mainstream zone and the advanced treatment zone can be directly connected through a pipeline; or one or more of a coagulative sedimentation tank, a filter tank, and a disinfection tank can also be disposed between the mainstream zone and the advanced treatment zone.

6. The system of claim 1, wherein the high-ammonia nitrogen anammox nitrogen removal zone in the sidestream zone can adopt an integrated anammox process, or a two-stage anammox process to enrich anammox bacteria on a biofilm; and the concentration of influent ammonia nitrogen in the sidestream zone is 300-1500 mg/L, the concentration of the dissolved oxygen is 0.2-1.0 mg/L, and a TN removal load is controlled to be 0.3-3 $kgN/(m^3 \cdot d)$.

7. The system of claim 1, wherein in the mainstream zone, the biofilm and the flocculent sludge coexist, and the concentration of the flocculent sludge is 1500-6000 mgSS/L; the denitrification fluidized bed in the advanced treatment zone does not contain flocculent sludge; and in the sidestream zone, the biofilm and the flocculent sludge coexist, and the concentration of the flocculent sludge is 6000-10000 mgSS/L.

* * * * *